United States Patent
Lee

(10) Patent No.: US 10,182,589 B2
(45) Date of Patent: Jan. 22, 2019

(54) JUICER WITH SIMPLE ASSEMBLY AND DISASSEMBLY OF HOUSING

(76) Inventor: Ji Hye Lee, Busan (KR)

( * ) Notice: Subject to any disclaimer, the term of this patent is extended or adjusted under 35 U.S.C. 154(b) by 287 days.

(21) Appl. No.: 14/352,977

(22) PCT Filed: Nov. 9, 2011

(86) PCT No.: PCT/KR2011/008516
§ 371 (c)(1),
(2), (4) Date: Apr. 18, 2014

(87) PCT Pub. No.: WO2013/069828
PCT Pub. Date: May 16, 2013

(65) Prior Publication Data
US 2014/0245906 A1 Sep. 4, 2014

(51) Int. Cl.
*A23N 1/02* (2006.01)
*A23N 1/00* (2006.01)
(Continued)

(52) U.S. Cl.
CPC .............. *A23N 1/00* (2013.01); *A23N 1/003* (2013.01); *A47J 19/025* (2013.01); *A47J 19/06* (2013.01); *A47J 19/00* (2013.01)

(58) Field of Classification Search
CPC ........... A47J 19/06; A47J 19/00; A23N 1/003; A23N 1/00
USPC .......... 99/510, 495, 509, 511, 513; 100/117, 100/145, 147, 148; 241/37.5, 92, 93, 241/260.1, 74
See application file for complete search history.

(56) References Cited

U.S. PATENT DOCUMENTS 5,156,872 A * 10/1992 Lee ............................ A23N 1/00
100/117
5,396,836 A * 3/1995 Kim ........................... A47J 19/06
241/101.2
(Continued)

FOREIGN PATENT DOCUMENTS

KR 20-1994-0002155 Y1 4/1994
KR 20-1996-0003077 Y1 4/1996
(Continued)

OTHER PUBLICATIONS

International Search Report for International Application No. PCT/KR2011/008516.

*Primary Examiner* — Reginald L Alexander
(74) *Attorney, Agent, or Firm* — LRK Patent Law Firm

(57) ABSTRACT

A juice extractor with an easily assembled and disassembled housing includes: a driving unit having a motor housing having a motor mounted at the inside thereof, a rotary shaft connected to the motor and protruded toward one side of the motor housing, and a fixing shaft disposed adjacent to the rotary shaft on the motor housing; a juice extracting unit having roller portions operated by the motor provided at the driving unit to crush, extract and transfer juice extraction materials and the housing for accommodating the roller portions thereinto; a fastening unit for detachably coupling the housing of the juice extracting unit to the motor housing; and a sensor unit having a sensor operator mounted on the housing of the juice extracting unit and a sensor mounted on the motor housing in such a manner as to be operated by a change in distance with the sensor operator.

5 Claims, 13 Drawing Sheets

(51) Int. Cl.
*A47J 19/06* (2006.01)
*A47J 19/02* (2006.01)
*A47J 19/00* (2006.01)

(56) References Cited

U.S. PATENT DOCUMENTS

| | | | | |
|---|---|---|---|---|
| 5,452,650 | A * | 9/1995 | Lee | A47J 19/06 241/101.2 |
| 5,852,968 | A * | 12/1998 | Sundquist | A47J 43/06 241/282.1 |
| 7,018,091 | B2 * | 3/2006 | Arroubi | A47J 43/0716 241/37.5 |
| 7,421,941 | B2 * | 9/2008 | Kim | A47J 27/004 99/281 |
| 8,474,374 | B2 * | 7/2013 | Trovinger | A23N 1/02 100/145 |

FOREIGN PATENT DOCUMENTS

| | | |
|---|---|---|
| KR | 20-1997-0002058 Y1 | 3/1997 |
| KR | 10-0858333 B1 | 9/2008 |
| KR | 20-2010-0008882 U | 9/2010 |

\* cited by examiner

JUICER WITH SIMPLE ASSEMBLY AND DISASSEMBLY OF HOUSING

TECHNICAL FIELD

The present invention relates to a juice extractor with an easily assembled and disassembled housing, and more particularly, to a juice extractor with an easily assembled and disassembled housing that is capable of easily coupling a juice extracting unit adapted to extract water or oil contained in juice extraction materials introduced thereinto to a driving unit, easily separating roller portions from the housing into which the roller portions are accommodated, and effectively conducting the extracting operation.

BACKGROUND ART

Generally, a juice extractor is a kind of a juicer that crushes various materials such as vegetables or fruits and extracts juice therefrom, which generally makes use of a centrifugal separation system and a twin-gear system.

The centrifugal separation system is appropriately adopted for the juicers extracting the juice from fruits, but through the centrifugal separation system, if vegetables having a lot of fiber and a less amount of water contained therein are finely cut and rotated at a substantially high speed, a juice extraction rate is not high and further heavy metals may be discharged from the juice.

Contrarily, the twin-gear system is configured to finely cut the materials and then compress them or at the same time to finely cut and compress them. Accordingly, a juice extraction rate in the twin-gear system is higher by several times than that in the centrifugal separation system, and further, heavy metals are not discharged from the juice. Therefore, most of juice extractors, which have been shipped, are provided with the twin-gear system.

The juice extractor having the twin-gear system includes a pair of helical-gear type crushing units and a pair of Archimedes spiral type transferring units, and after the crushing parts and the transferring units are accommodated into a housing on which juice extracting holes are formed, the housing and a driving unit are coupled to each other by means of a fastening unit.

The pair of crushing units is driven by means of the driving unit and engagedly rotates to crush the materials introduced thereinto and extract the juice from the crushed materials. Next, the crushing units convey the crushed materials to the transferring units, and the transferring units convey the crushed materials and compress the transferred materials to extract the juice from the compressed materials.

The fastening unit includes two arms hinge-coupled to one end of the driving unit and having semi-circular sectional shapes, a lever extended hinge-coupled to the front end of one arm, and a link hinge-coupled to the front end of the other arm and to the intermediate portion of the lever.

According to the conventional fastening unit, by the way, the front ends of the two arms hinge-coupled to one end of the driving unit are laid on each other at the same position as each other, and therefore, the two arms are moved individually, so that at the time when the housing is coupled to the driving unit, the two arms should be adjusted in position.

After the juice is extracted from the materials, further, remnants remain in the housing, and if the housing is separated for washing, it is not easy to separate the housing due to the remnants caught between the housing and the crushing units or between the housing and the transferring units. Further, the extracting operation may stop unexpectedly by the remnants caught between the housing and the crushing units or between the housing and the transferring units.

DISCLOSURE

Technical Problem

Accordingly, the present invention has been made in view of the above-mentioned problems occurring in the prior art, and it is an object of the present invention to provide a juice extractor with an easily assembled and disassembled housing that is provided with a fastening unit that has two arms hinge-coupled at the front ends thereof to a driving unit and having protrusion portions facing each other in such a manner as to be engaged with each other, thus allowing the two arms to be at the same time moved, so that when the housing is coupled to the driving unit, there is no need to adjust the position of the fastening unit, that is provided with a sensor unit mounted on portions wherein the driving unit and the housing face each other, so that when the housing is separated from the driving unit, power application to the driving unit stops by the operation of the sensor unit to allow the housing to be easily separated from the driving unit and thus to prevent the occurrence of the injuries caused by the operation of the driving unit at the time of the separation of the housing or after the separation of the housing, and that is capable of easily restarting an extracting operation when the extracting operation stops due to remnants of juice extraction materials.

Technical Solution

To accomplish the above-mentioned object, according to the present invention, there is provided a juice extractor with an easily assembled and disassembled housing, the juice extractor including: a driving unit having a motor housing having a motor mounted at the inside thereof, a rotary shaft connected to the motor and protruded toward one side of the motor housing, and a fixing shaft disposed adjacent to the rotary shaft on the motor housing; a juice extracting unit having roller portions operated by the motor provided at the driving unit so as to crush, extract and transfer juice extraction materials and the housing for accommodating the roller portions thereinto; a fastening unit for detachably coupling the housing of the juice extracting unit to the motor housing; and a sensor unit having a sensor operator mounted on the housing of the juice extracting unit and a sensor mounted on the motor housing in such a manner as to be operated by a change in distance with the sensor operator.

According to the present invention, preferably, the roller portions include a crushing roller portion for crushing, extracting and transferring the juice extraction materials and a juice extracting roller portion for transferring, pressurizing and extracting the juice extraction materials transferred from the crushing roller portion, the crushing roller portion including a first crushing roller and a second crushing roller coupled correspondingly to the rotary shaft and the fixing shaft and having helical-gear type crushing blades engaged with each other, the juice extracting roller portion including a first juice extracting roller and a second juice extracting roller extended forwardly from the first crushing roller and the second crushing roller and having outer peripheral surfaces decreased in diameter as they go toward the front sides thereof, circular locking protrusions formed protrudedly on the outer peripheral surfaces thereof, first protrusion portions spirally protruded along the outer peripheral surfaces behind the locking protrusions, and second protrusion portions spirally protruded along the outer peripheral surfaces in front of the locking protrusions; wherein the housing includes a crushing housing portion and juice extracting housing portions branched from the crushing housing portion in such a manner as to be extended forwardly therefrom, the first crushing roller and the second crushing roller being inserted into the crushing housing portion in such a manner as to allow the crushing blades thereof to be engaged with each other, and the first juice extracting roller and the second juice extracting roller being inserted into the juice extracting housing portions.

According to the present invention, preferably, the gaps formed between the outer diameters of the locking protrusions and the inner diameters of the juice extracting housing portions are larger than the gaps formed between the outer diameters of the first protrusion portions and the inner diameters of the juice extracting housing portions.

According to the present invention, preferably, the gaps formed between the outer diameters of the locking protrusions and the inner diameters of the juice extracting housing portions are larger by 1 mm~2 mm than the gaps formed between the outer diameters of the first protrusion portions and the inner diameters of the juice extracting housing portions.

According to the present invention, preferably, the fastening unit includes a first arch-shaped arm having one end portion hinge-coupled to the front side of the motor housing by means of a first hinge portion, a second arch-shaped arm having one end portion hinge-coupled to the front side of the motor housing by means of a second hinge portion, a lever hinge-coupled to the other end portion of the second arm, and a link having one end hinge-coupled to the other end portion of the first arm and the other end hinge-coupled to the intermediate portion of the lever, the first arm having a first protrusion portion formed on the hinge-coupled portion to the first hinge portion and the second arm having a second protrusion portion formed on the hinge-coupled portion to the second hinge portion, the first protrusion portion and the second protrusion portion contactedly intersecting with each other.

According to the present invention, preferably, the motor is a reversible motor, and upon forward rotation, the motor is driven with the lower output than the output upon reverse rotation.

Advantageous Effects

According to the present invention, the juice extractor with an easily assembled and disassembled housing is configured wherein the fastening unit includes the two arms hinge-coupled at the front ends thereof to the driving unit and having protrusion portions facing each other in such a manner as to be engaged with each other, thus allowing the two arms to be at the same time moved, so that when the housing is coupled to the driving unit, there is no need to adjust the position of the fastening unit, and wherein the sensor unit is mounted on portions wherein the driving unit and the housing face each other, so that the housing is easily separated from roller portions, and the occurrence of the injuries caused by the operation of the roller portions at the time of the separation of the housing or after the separation of the housing is prevented, thus conducting an effective extracting operation.

MODE FOR INVENTION

Hereinafter, an explanation on a juice extractor with an easily assembled and disassembled housing according to the present invention will be in detail given with reference to the attached drawings.

Figure 1:
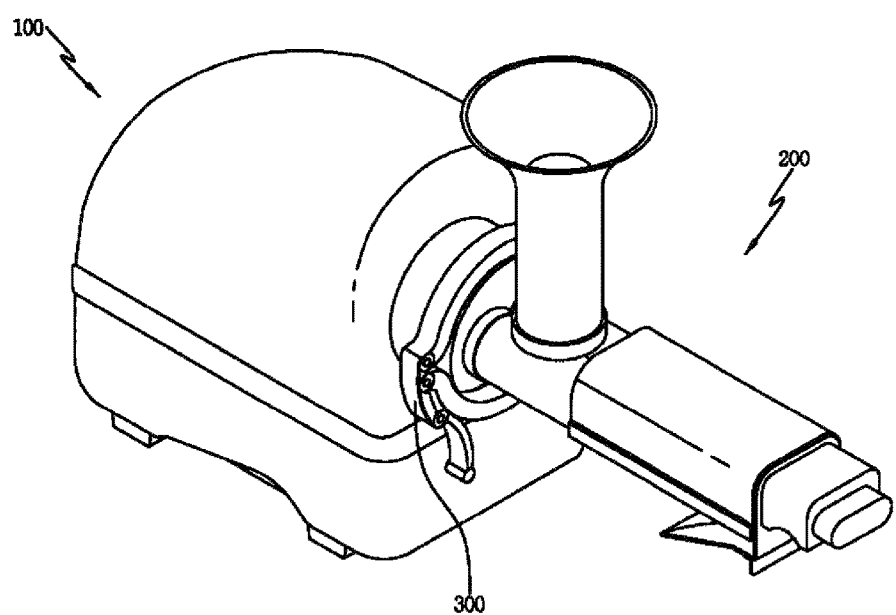
FIG. 1 is a perspective view showing a juice extractor with an easily assembled and disassembled housing according to the present invention.
Figure 2:
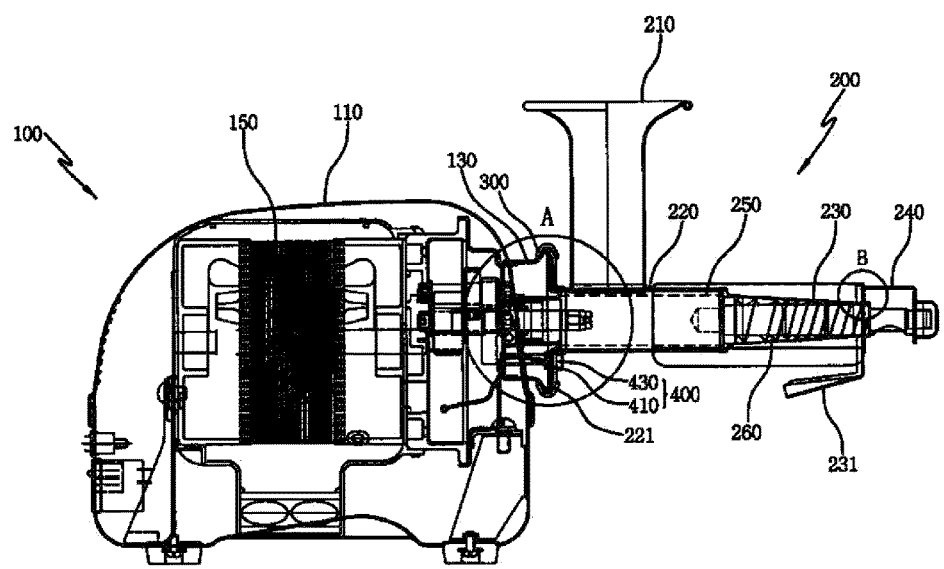
FIG. 2 is a side sectional view showing the juice extractor according to the present invention.
Figure 3:
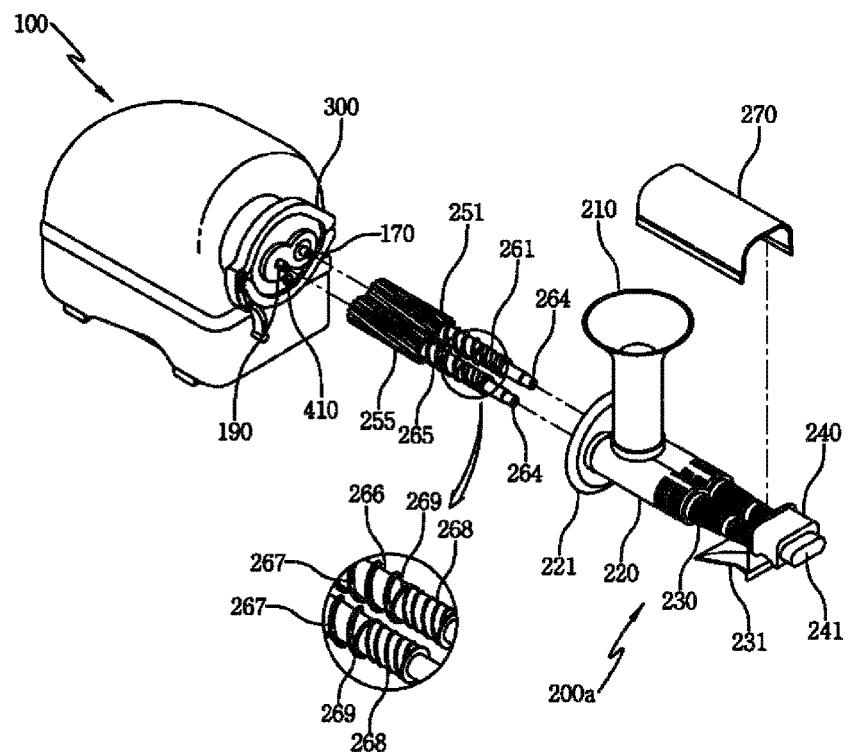
FIG. 3 is an exploded perspective view showing the juice extractor according to the present invention.
Figure 4:
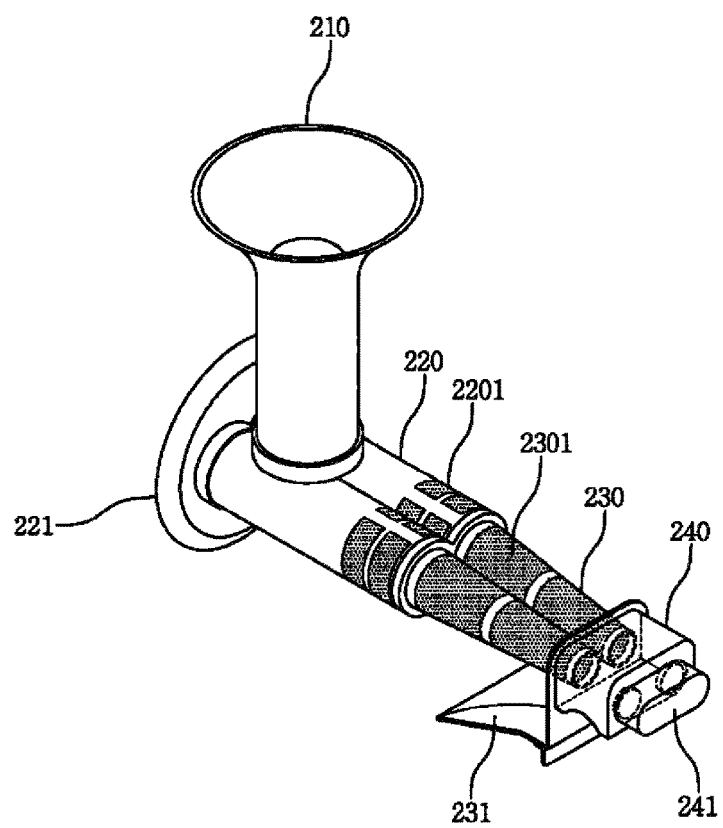
FIG. 4 is a perspective view showing the housing of the juice extractor according to the present invention.
Figure 5:
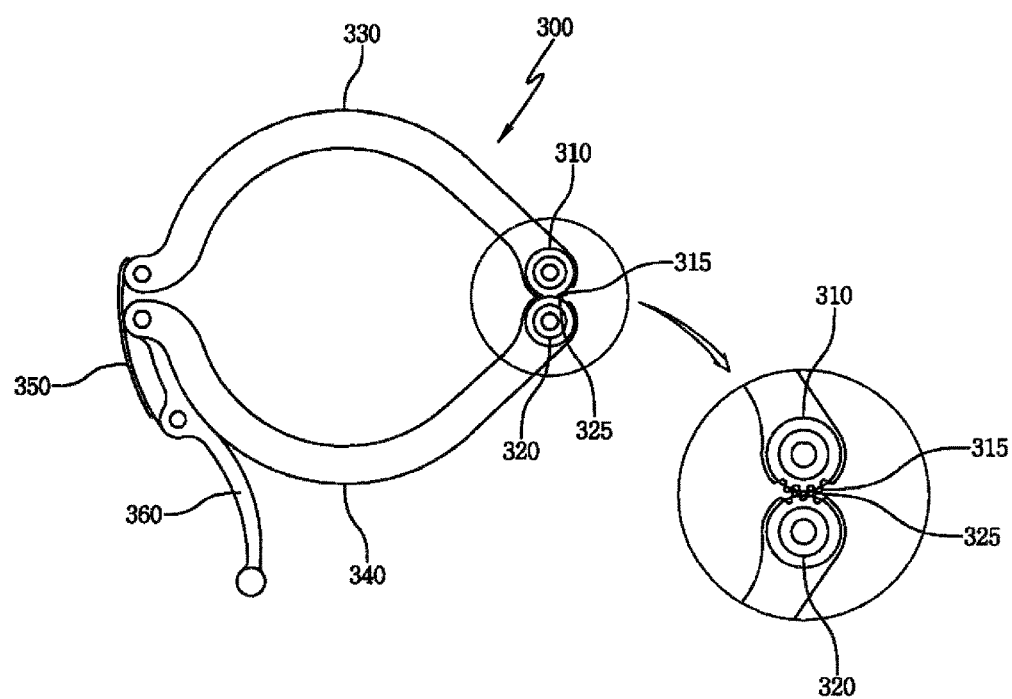
FIG. 5 is a front view showing a fastening unit of the juice extractor according to the present invention.
Figure 6:
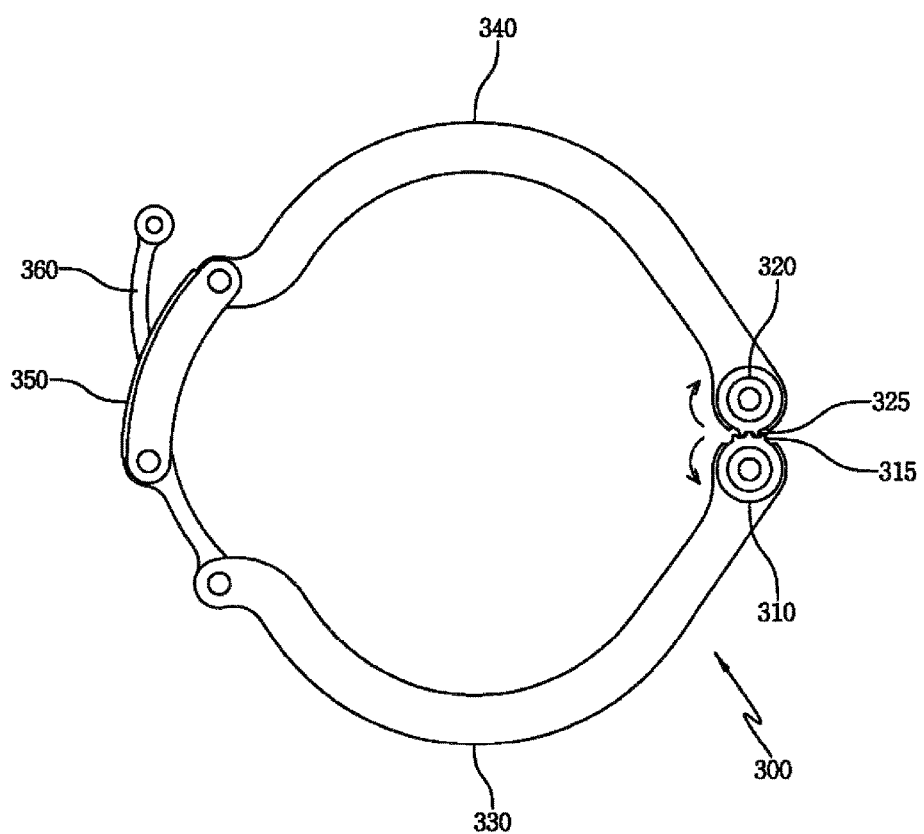
FIG. 6 is a front view showing the operating state of the fastening unit of the juice extractor according to the present invention.
Figure 7:
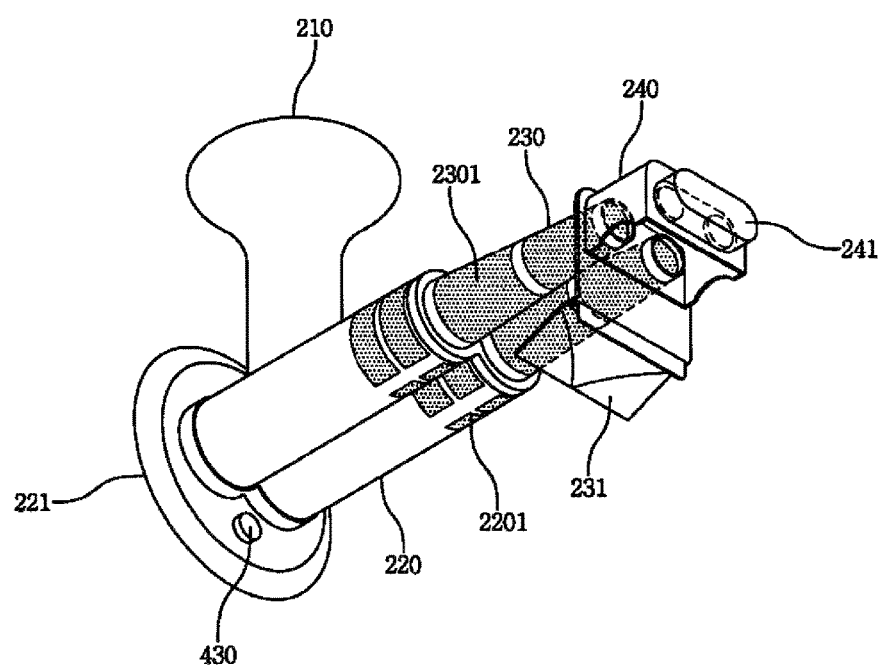
FIG. 7 is a bottom perspective view showing the housing of the juice extractor according to the present invention.
Figure 8:
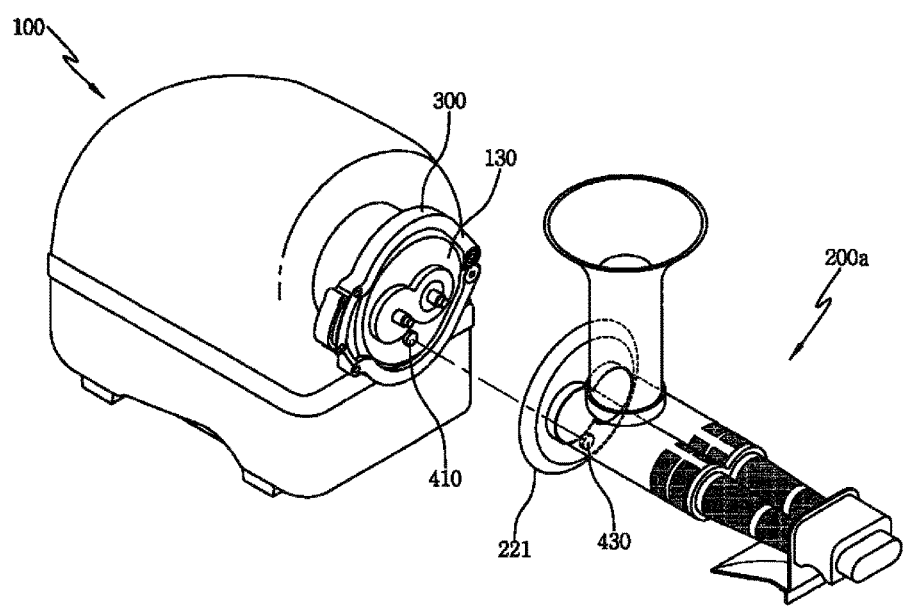
FIGS. 8 and 9 are perspective views showing the assembling processes of the housing of the juice extractor according to the present invention.
Figure 9:
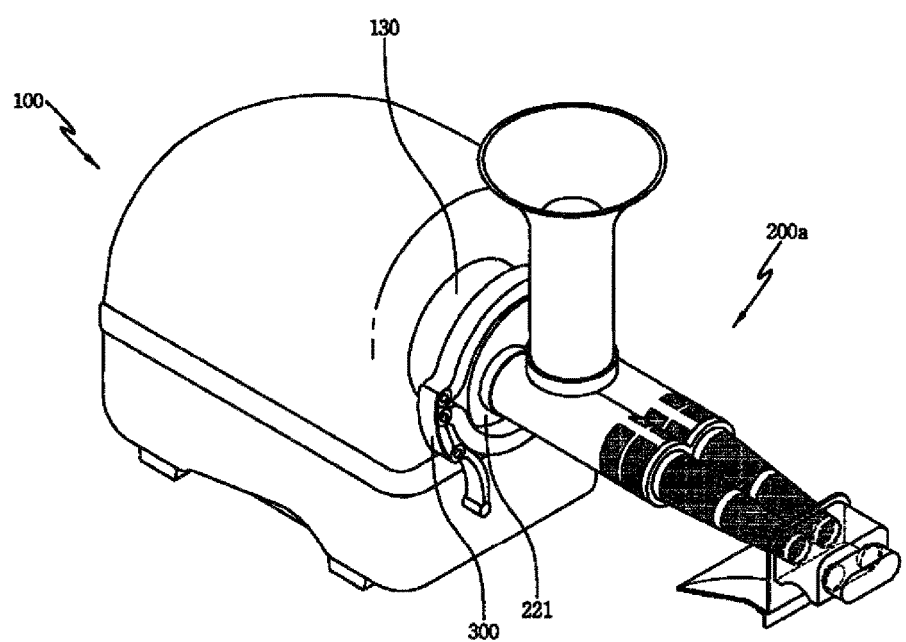
Figure 10:
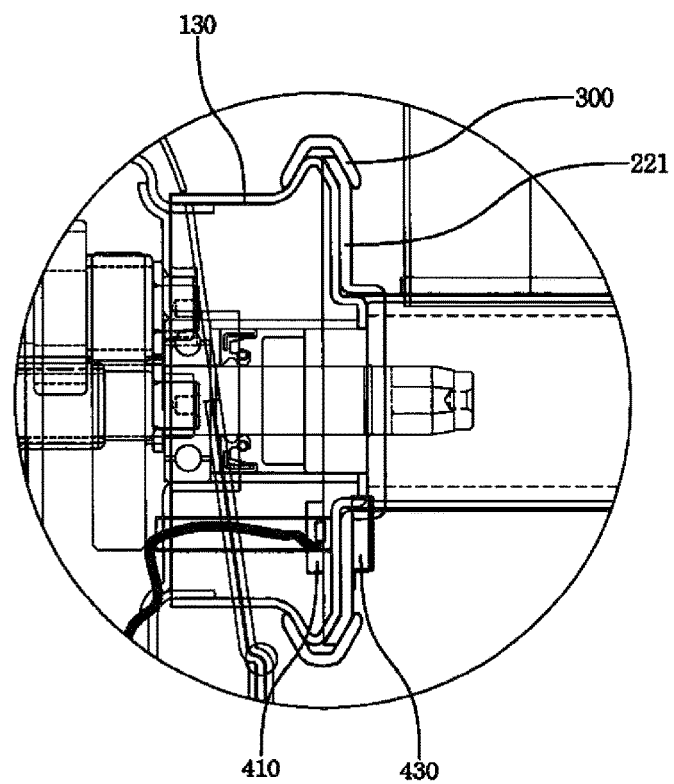
FIG. 10 is an enlarged sectional view showing a portion 'A' of FIG. 2.
Figure 11:
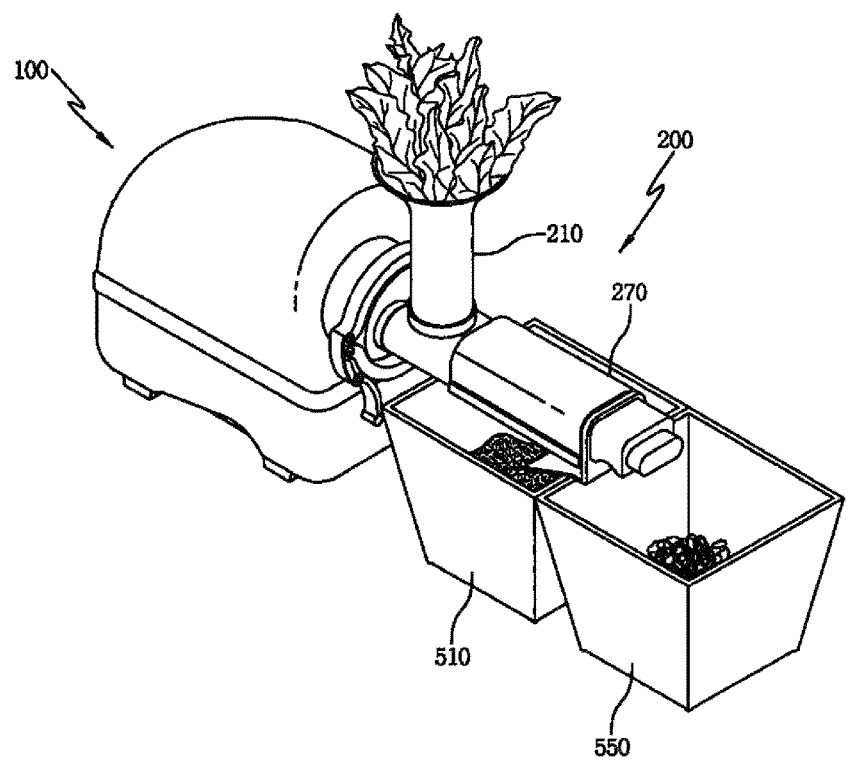
FIG. 11 is a perspective view showing an example wherein juice is extracted through the juice extractor according to the present invention.
Figure 12:
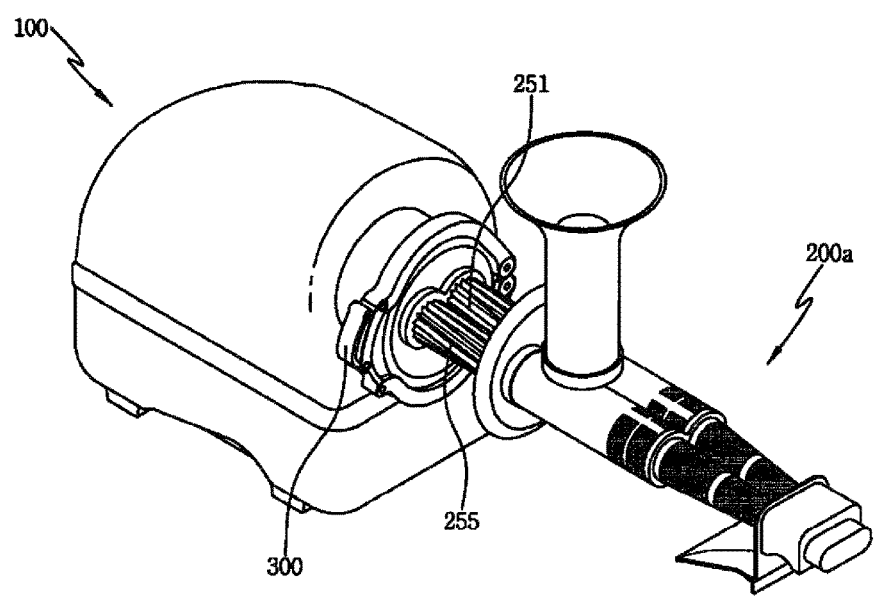
FIG. 12 is a perspective view showing an example wherein the housing is separated from a driving unit in the juice extractor according to the present invention.
Figure 13:
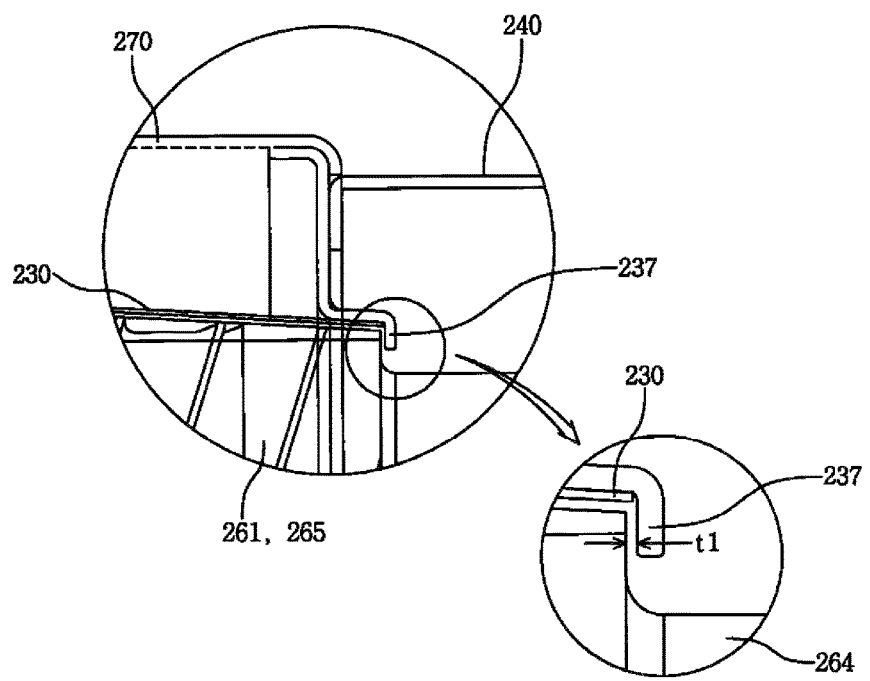
FIG. 13 is an enlarged sectional view showing a portion 'B' of FIG. 2.

FIG. 1 is a perspective view showing a juice extractor with an easily assembled and disassembled housing according to the present invention, FIG. 2 is a side sectional view showing the juice extractor according to the present invention, FIG. 3 is an exploded perspective view showing the juice extractor according to the present invention, FIG. 4 is a perspective view showing the housing of the juice extractor according to the present invention, FIG. 5 is a front view showing a fastening unit of the juice extractor according to the present invention, FIG. 6 is a front view showing the operating state of the fastening unit of the juice extractor according to the present invention, FIG. 7 is a bottom perspective view showing the housing of the juice extractor according to the present invention, FIGS. 8 and 9 are perspective views showing the assembling processes of the housing of the juice extractor according to the present invention, FIG. 10 is an enlarged sectional view showing a portion 'A' of FIG. 2, FIG. 11 is a perspective view showing an example wherein juice is extracted through the juice extractor according to the present invention, FIG. 12 is a perspective view showing an example wherein the housing is separated from a driving unit in the juice extractor according to the present invention, and FIG. 13 is an enlarged sectional view showing a portion 'B' of FIG. 2.

Hereinafter, the horizontal direction in FIG. 2 is referred to as "lengthwise direction", the left direction therein as "rear side", and the right direction therein as "front side". Further, the direction from the front side to the rear side is indicated by "first direction", and the vertical direction in FIG. 2 is indicated by upper and lower sides.

According to the present invention, as shown in FIGS. 1 and 2, a juice extractor with an easily assembled and disassembled housing includes a driving unit 100 connected to a juice extracting unit 200 so as to drive the juice extracting unit 200, the juice extracting unit 200 connected to the driving unit 100 and driven by the driving unit 100 so as to crush and pressurize materials to be extracted (hereinafter referred to as "juice extraction materials") such as vegetables or fruits and thus to extract juice therefrom, and a fastening unit 300 adapted to detachably couple the driving unit 100 to the juice extracting unit 200.

As shown in FIGS. 1, 2, 3 and 10, the driving unit 100 includes: a motor housing 110 having a motor 150 mounted at the inside thereof and a first hollow connection portion 130 protruded forwardly therefrom in such a manner as to be increased and then decreased in diameter on the end portion thereof toward the front sides thereof in the lengthwise direction thereof; a rotary shaft 170 having one end portion connected to the motor 150 and the other end portion protruded outwardly from the first connection portion 130 in the lengthwise direction thereof; and a fixing shaft 190 protruded from the first connection portion 130 in such manner as to be located side by side with the rotary shaft 170. The rotary shaft 170 is connected to the motor 150 through a decelerator (not shown).

The front end portion of the first connection portion 130 has a shape of a plate whose central portion is protrudedly closed. The protrusion portion on the center of the front end portion of the first connection portion 130 has a shape having two circles facing each other, so that the fixing shaft 190 is protrudedly disposed from the center of one side circle and the rotary shaft 170 is protrudedly passed through the center of the other side circle.

As shown in FIGS. 1 to 4, the juice extracting unit 200 includes roller portions rotatably connected to the driving unit 100 and a hollow housing 200a adapted to accommodate the roller portions thereinto in such a manner as to be coupled to the motor housing 110 of the driving unit 100. The roller portions include a crushing roller portion 250 and a juice extracting roller portion 260 connected to the front side of the crushing roller portion 250 in such a manner as to be decreased in diameter toward the front sides thereof. As the roller portions are accommodated into the housing 200a and rotated therein, they crush and pressurize the juice extraction materials and then transfer the crushed and pressurized juice extraction materials.

As shown in FIGS. 3 and 4, the housing 200a is extended radially from the rear end portion toward the driving unit 100 and has a second connection portion 221 formed on the edge periphery thereof in such a manner as to have a shape of a plate inclined toward the driving unit 100. The second connection portion 221 has a round edge periphery.

As shown in FIG. 3, the crushing roller portion 250 includes a first crushing roller 251 coupled to the rotary shaft 170 in such a manner as to be rotated unitarily with the rotary shaft 170 and having crushing blades formed on the outer peripheral surface thereof and a second crushing roller 255 rotatably coupled to the fixing shaft 190. The rotary shaft 170 is spline-coupled on the outer peripheral surface thereof or has a polygonal sectional shape, and thus, it is inserted into the first crushing roller 251 in such a manner as to allow the spline to be engaged with the first crushing roller 251 or to form a concave groove having a polygonal sectional shape. The fixing shaft 190 has a circular sectional shape, and the second crushing roller 255 forms a concave groove having a circular sectional shape, into which the fixing shaft 190 is inserted, so that the second crushing roller 255 is inserted into the fixing shaft 190 and runs idle. The first crushing roller 251 and the second crushing roller 255 have protrusions formed forwardly therefrom or have concave grooves formed on the front surfaces thereof.

The crushing blades formed on the outer peripheral surface of the first crushing roller 251 are engaged with those formed on the second crushing roller 255, and accordingly, if the first crushing, roller 251 coupled to the rotary shaft 170 is rotated unitarily with the rotary shaft 170, the second crushing roller 255 idly coupled to the fixing shaft 190 is rotated by means of the crushing blades engaged with the crushing blades formed on the first crushing roller 251. Further, the juice extraction materials are crushed and extracted by means of the crushing blades engagedly rotating and then transferred forwardly. When viewed in the first direction of FIG. 3, the first crushing roller 251 inserted into the rotary shaft 170 is rotated in a counterclockwise direction, and the second crushing roller 255 is rotated in a clockwise direction by means of the first crushing roller 251, so that the juice extraction materials introduced toward the first crushing roller 251 and the second crushing roller 255 are crushed and transferred by means of the crushing blades engagedly rotating. At this time, the crushing blades engagedly formed on the outer peripheral surfaces of the first crushing roller 251 and the second crushing roller 255 are formed in the shape of helical gears, and when viewed from the top, they are formed in a shape of "V" toward the front sides thereof, so that the introduced juice extraction materials can be crushed by means of the crushing blades and transferred forwardly. The lead angles of the crushing blades are formed smaller than 30°, so that the juice extraction materials can be rapidly transferred forwardly, while being crushed.

As shown in FIGS. 2, 3 and 13, the juice extracting roller portion 260 includes a first juice extracting roller 261 and a second juice extracting roller 265 each having a spiral protrusion from the outer peripheral surface thereof. The first juice extracting roller 261 is coupled to the first crushing roller 251 or the second crushing roller 255, and if the first juice extracting roller 261 is coupled to the first crushing roller 261, the second juice extracting roller 265 is coupled to the second crushing roller 255. Hereinafter, the configuration of the juice extracting roller portion 260 will be explained wherein the first juice extracting roller 261 is coupled to the first crushing roller 251 in such a manner as to be rotated unitarily with the first crushing roller 251 and the second juice extracting roller 265 is coupled to the second crushing roller 255 in such a manner as to be rotated unitarily with the second crushing roller 255.

The first crushing roller 251 and the second crushing roller 255 have the protrusions protruded forwardly therefrom or have the concave groove formed thereon in such a manner as to be coupled to the first juice extracting roller 261 and the second juice extracting roller 265. Accordingly, the first juice extracting roller 261 and the second juice extracting roller 265 have the grooves formed on the rear portions thereof, into which the protrusions formed on the first crushing roller 251 and the second crushing roller 255 are inserted, and otherwise, they have the protrusions formed on the rear portions thereof in such a manner as to be inserted into the concave grooves formed on the front portions of the first crushing roller 251 and the second crushing roller 255. At this time, the first crushing roller 251 and the first juice extracting roller 261 are tight fitted to each other so that they can be rotated unitarily with each other, and in the same manner as above, the second crushing roller 255 and the second juice extracting roller 265 are tight fitted to each other so that they can be rotated unitarily with each other. Of course, the first juice extracting roller 261 may be formed unitarily with the first crushing roller 251 and the second juice extracting roller 265 unitarily with the second crushing roller 255.

As shown in FIGS. 2 and 3, the first juice extracting roller 261 and the second juice extracting roller 265 of the juice extracting roller portion 260 are tapered in diameter along the outer peripheral surfaces 266 thereof toward the front portions thereof. The spiral protrusions are formed along the outer peripheral surfaces 266 of the first juice extracting roller 261 and the second juice extracting roller 265, and they are divided into first protrusion portions 267 and second protrusion portions 268 by means of round locking protrusions 269 formed from the center of the outer peripheral surfaces 266 in the lengthwise directions of the first juice extracting roller 261 and the second juice extracting roller 265, wherein the first protrusion portions 267 are formed behind the locking protrusions 269 and the second protrusion portions 268 are formed in front of the locking protrusions 269. The first protrusion portions 267 and the second protrusion portions 268 are spirally protruded so that the juice extraction materials crushed and transferred from the crushing roller portion 250 can be transferred forwardly.

The juice extraction materials can be extracted with different pressure behind and in front of the locking protrusions 269. The pitches of the first protrusion portions 267 are higher than those of the second protrusion portions 268. Further, the first juice extracting roller 261 and the second juice extracting roller 265 have stepped portions formed on the front end portions thereof, and further, they have extension portions 264 extended from the stepped portions in such a manner as to have smaller diameters than the end portions of the first juice extracting roller 261 and the second juice extracting roller 265.

As shown in FIGS. 3, 4 and 7, the housing 200a includes a hollow crushing housing portion 220 and hollow juice extracting housing portions 230 extended in the lengthwise direction thereof from the crushing housing portion 220 in such a manner as to be tapered in diameter toward the front portions thereof. The two juice extracting housing portions 230 are branched and, extended from the crushing housing portion 220.

The crushing housing portion 220 has a sectional shape having two circles facing each other, and thus, the crushing blades of the first crushing roller 251 and the second crushing roller 255 are inserted into the crushing housing portion 220, while being engaged to each other. A hollow hopper 210 is extended upwardly from the top portion of the crushing housing portion 220 so as to introduce the juice extraction materials into the crushing housing portion 220, and the crushing housing portion 220 has a through hole formed on the portion corresponding to the hopper 210 in such a manner as to communicate with the hopper 210.

As shown in FIGS. 3 and 4, the crushing housing portion 220 has a plurality of first juice extracting holes 2201 as fine through holes formed on the front end periphery thereof. If the juice extraction materials are introduced into the hopper 210, they are crushed and transferred forwardly through the engagedly rotating crushing blades of the first crushing roller 251 and the second crushing roller 255, and a portion of the juice extracted from the juice extraction materials through the crushing is discharged through the first juice extracting holes 2201.

The juice extracting housing portions 230 have a plurality of second juice extracting holes 2301 as fine through holes formed thereon and further have a plate-shaped base 231 slant downwardly therefrom. As shown in FIGS. 3 and 4, when the first juice extracting roller 261 and the second juice extracting roller 265 are inserted into the juice extracting housing portions 230, the second juice extracting holes 2301 are formed at the portions on the juice extracting housing portions 230 corresponding to the portions where the first protrusion portions 267 and the second protrusion portions 268 are formed, while interposing the portions where the locking protrusions 269 are formed therebetween.

As shown in FIGS. 3, 4, 7 and 13, the juice extracting housing portions 230 have a deviation preventing portion 240 disposed on the end portions thereof in the lengthwise direction thereof, and the deviation preventing portion 240 is coupled at one end portion thereof to the juice extracting housing portions 230 and has an accommodation portion 241 formed on the other end portion thereof. The accommodation portion 241 is separately formed from the lengthwise direction thereof from one end portion of the deviation preventing portion 240 coupled to the juice extracting housing portions 230. The extension portions 264 extended from the end portions of the first juice extracting roller 261 and the second juice extracting roller 265 in the state of being housed in the juice extracting housing portions 230 are passed through one end portion of the deviation preventing portion 240 protruded forwardly from the end portions of the juice extracting housing portions 230 and then supportedly inserted into the accommodation portion 241 separately formed from one end portion of the deviation preventing portion 240. The accommodation portion 241 has two through holes formed thereon in such a manner as to rotatably insert and support the extension portions 264 of the first juice extracting roller 261 and the second juice extracting roller 265 thereinto. Furthermore, the deviation preventing portion 240 has an opening formed downwardly between one end portion coupled to the juice extracting housing portions 230 and the accommodation portion 241, and after the extraction, the remnants of the juice extraction materials after the extraction are discharged to the outside. The base 231 is slantly formed downwardly and backwardly from one end portion of the deviation preventing portion 240 coupled to the juice extracting housing portions 230 in such a manner as to be located under the juice extracting housing portions 230. Accordingly, a portion of the juice extracted through the juice extracting roller portion 260 and discharged through the second juice extracting holes 2301 is dropped onto the base 231 and flows downwardly along the base 231.

As shown in FIGS. 2 and 13, the juice extracting housing portions 230 have first round portions 237 radially extended inwardly from the end portions thereof and open in the lengthwise direction thereof, so that the first round portions 237 face the stepped portions formed on the end portions of the first juice extracting roller 261 and the second juice extracting roller 265, and the extension portions 264 are passed through the open portions of the first round portions 237. Gaps t1 are formed in the lengthwise direction between the stepped portions and the first round portions 237, and gaps are formed radially between the inner diameters of the open portions of the first round portions 237 and the outer diameters of the extension portions 264.

As shown in FIG. 2, a cover 270 is detachably mounted on the crushing housing portion 220 and the juice extracting housing portions 230 so as to cover the first juice extracting holes 2201 formed on the crushing housing portion 220 and the second juice extracting holes 2301 formed on the juice extracting housing portions 230. The cover 270 has a sectional shape of 'ᴄ' in such a manner as to insert the crushing housing portion 220 and the juice extracting housing portions 230 thereinto in the open direction thereof. The formation of the cover 270 prevents the juice discharged through the first juice extracting holes 2201 and the second juice extracting holes 2301 from being dispersed upwardly and further keeps the foreign matters like dust from being introduced into the crushing housing portion 220 and the juice extracting housing portions 230.

As mentioned above, the first crushing roller 251 and the second crushing roller 255 are located inside the crushing housing portion 220 of the housing 200a, and the first juice extracting roller 261 and the second juice extracting roller 265 are located inside the juice extracting housing portions 230 of the housing 200a. Further, the extension portions 264 extended from the end portions of the first juice extracting roller 261 and the second juice extracting roller 265 are passed protrudedly through the first round portions 237 formed on the end portions of the juice extracting housing portions 230 and rotatably inserted into the accommodation portion 241.

In the relation of the first crushing roller 251 and the second crushing roller 255 with the juice extracting housing portions 230, the gaps formed between the outer diameters of the locking protrusions 269 and the inner diameters of the juice extracting housing portions 230 are desirably larger than those formed between the outer diameters of the first protrusion portions 267 and the inner diameters of the juice extracting housing portions 230 and those formed between the outer diameters of the second protrusion portions 268 and the inner diameters of the juice extracting housing portions 230. Desirably, they are larger by 1 mm~3 mm.

For example, if the gaps formed between the outer diameters of the first protrusion portions 267 and the inner diameters of the juice extracting housing portions 230 and between the outer diameters of the second protrusion portions 268 and the inner diameters of the juice extracting housing portions 230 are 3 mm, the gaps formed between the outer diameters of the locking protrusions 269 and the inner diameters of the juice extracting housing portions 230 are within the range between 4 mm and 6 mm.

Since the first protrusion portions 267 and the second protrusion portions 268 are spirally formed, the juice extraction materials are guided by the first protrusion portions 267 and the second protrusion portions 268 and transferred between the outer peripheral surfaces 266 and the inner peripheral surfaces of the juice extracting housing portions 230. However, the locking protrusions 269 are roundedly formed, and therefore, even if the gaps formed between the outer diameters of the locking protrusions 269 and the inner diameters of the juice extracting housing portions 230 are larger than those formed between the outer diameters of the first protrusion portions 267 and the inner diameters of the juice extracting housing portions 230 and those formed between the outer diameters of the second protrusion portions 268 and the inner diameters of the juice extracting housing portions 230, the area of the juice extraction materials to be passed becomes small. Accordingly, a pressure formed from the locking protrusions 269 is applied to the crushed juice extraction materials.

If the gaps formed between the outer diameters of the locking protrusions 268 and the inner diameters of the juice extracting housing portions 230 are equal to or smaller than those formed between the outer diameters of the first protrusion portions 267 and the inner diameters of the juice extracting housing portions 230 or those formed between the outer diameters of the second protrusion portions 268 and the inner diameters of the juice extracting housing portions 230, an amount of juice extracted from the juice extraction materials is increased, but the juice extraction materials being transferred are excessively blocked by means of the locking protrusions 268, so that the juice extraction materials get caught between the juice extracting housing portions 230 and the juice extracting roller portion 260, thus making the operation stop. Of course, if the gaps formed between the outer diameters of the locking protrusions 268 and the inner diameters of the juice extracting housing portions 230 are larger than the above-mentioned range, the pressure applied from the locking protrusions 269 to the juice extraction materials is not sufficient to cause an amount of juice extracted to be remarkably decreased.

Through the locking protrusions 269, the extraction pressure applied to the juice extraction materials from the first protrusion portions 267 is gradually increased from the rear sides of the first protrusion portions 267 toward the front sides thereof, thus allowing the juice extraction materials to be effectively extracted.

The gaps t1 are formed in the lengthwise direction between the stepped portions of the first juice extracting roller 261 and the second juice extracting roller 265 and the first round portions 237, and the gaps are formed radially between the inner diameters of the first round portions 237 and the outer diameters of the extension portions 264, so that the juice extraction materials crushed and pressurized by means of the first protrusion portions 267 are transferred through the second protrusion portions 268, and in this case, since they are passed sequentially through the lengthwise gaps t1 and the radial gaps, their passing resistance becomes increased. Accordingly, the extraction pressure applied to the juice extraction materials from the second protrusion portions 268 is gradually increased from the front sides of the second protrusion portions 268 toward the rear sides thereof, thus allowing the juice extraction materials to be effectively extracted. The lengthwise gaps t1 are desirably larger by 1 mm~2 mm than the gaps formed between the second protrusion portions 268 and the inner diameters of the juice extracting housing portions 230.

If the lengthwise gaps t1 are smaller than the above-mentioned range, the juice extraction materials being transferred are excessively blocked, thus making the operation stop, and if the lengthwise gaps t1 are larger than the above-mentioned range, the extracting operation is not sufficiently carried out.

The juice extraction materials transferred forwardly and passed through the lengthwise gaps t1 and the radial gaps are next discharged downwardly through the open portions formed on the deviation preventing portion 240.

As mentioned above, through the locking protrusions 269, the extraction pressure applied to the juice extraction materials from the first protrusion portions 267 is gradually increased from the rear sides of the first protrusion portions 267 toward the front sides thereof, thus allowing the juice extraction materials to be effectively extracted.

Further, the first round portions 237 are formed on the front end portions of the juice extracting housing portions 230, and the gaps t1 are formed in the lengthwise direction between the stepped portions of the first juice extracting roller 261 and the second juice extracting roller 265 and the first round portions 237, so that the extraction pressure applied to the juice extraction materials from the second protrusion portions 268 is gradually increased from the front sides of the second protrusion portions 268 toward the rear sides thereof, thus allowing the juice extraction materials to be effectively extracted. According to the present invention, that is, the juice extracting housing portions 230 function to primarily apply the gradually increased extraction pressure, while transferring them, and then to secondarily apply the gradually increased extraction pressure to them, thus achieving effective extraction. If the locking protrusions 269 by which the gaps are formed are formed, an amount of extracted juice is increased by 5 times.

FIG. 5 is a front view showing the fastening unit 300 of the juice extractor according to the present invention, and FIG. 6 is a front view showing the open state of the fastening unit 300 of the juice extractor according to the present invention.

The fastening unit 300 is adapted to couple the housing 200a of the juice extracting unit 200 to the driving unit 100, and as shown in FIGS. 2, 5, 6 and 8, the fastening unit 300 includes arch-shaped a first arm 330 having one end portion hinge-coupled to the front side of the motor housing 110 by means of a first hinge portion 310, arch-shaped a second arm 340 having one end portion hinge-coupled to the front side of the motor housing 110 by means of a second hinge portion 320, a lever 360 hinge-coupled to the other end portion of the second arm 340, and a link 350 having one end hinge-coupled to the other end portion of the first arm 330 and the other end hinge-coupled to the intermediate portion of the lever 360. The first hinge portion 310 and the second hinge portion 320 are disposed spaced apart from each other on the motor housing 110. As shown in FIGS. 5 and 6, the first arm 330 and the second arm 340 have the shapes of the concaved arches facing each other. The first hinge portion 310 and the second hinge portion 320 are located on one side of the first connection portion 130, so that the first arm 330 and the second arm 340 are located to surround the upper and lower portions of the front side of the first connection portion 130.

Further, the first arm 330 has a first protrusion portion 315 formed on the hinge-coupled portion to the first hinge portion 310, and the second arm 340 has a second protrusion portion 325 formed on the hinge-coupled portion to the second hinge portion 320. The first protrusion portion 315 and the second protrusion portion 325 contactedly intersect with each other. Otherwise, they may have the shapes of gears engaged with each other. The first protrusion portion 315 and the second protrusion portion 325 are protruded radially with respect to the first hinge portion 310 and the second hinge portion 320. If the first arm 330 rotates around the first hinge portion 310, the second arm 340 rotates around the second hinge portion 320.

As shown in FIG. 6, if the first arm 330 rotates around the first hinge portion 310 in the clockwise direction, the second arm 340 is synchronized by means of the first protrusion portion 315 and the second protrusion portion 325 contactedly intersected with each other and is thus rotated around the second hinge portion 320 in the counterclockwise direction. In the same manner as above, if the first arm 330 rotates in the counterclockwise direction, the second arm 340 rotates in the clockwise direction.

The first arm 330 and the second arm 340 rotate symmetrically, and accordingly, if the first arm 330 rotates in the clockwise direction, the second arm 340 rotates in the counterclockwise direction, so that the first arm 340 and the second arm 340 are distant from each other, while interposing the first connection portion 130 therebetween. Contrarily, if the first arm 330 rotates in the counterclockwise direction, the second arm 340 rotates in the clockwise direction, so that the first arm 340 and the second arm 340 are close to each other, while interposing the first connection portion 130 therebetween.

So as to couple the juice extracting unit 200 to the driving unit 100, as shown in FIGS. 5 and 6, if the lever 360 rotates toward the second arm 340 with respect to the first arm 330, the link 350 hinge-coupled to the lever 360 is pulled toward the first arm 330 to cause the first arm 330 and the second arm 340 to be close to each other. Contrarily, if the lever 360 rotates toward the first arm 330 with respect to the second arm 340, the link 350 hinge-coupled to the lever 360 is distant from the second arm 340 to cause the first arm 330 and the second arm 340 to be distant from each other.

As shown in FIGS. 5 and 6, the lever 360 rotates in the clockwise direction to allow the first arm 330 and the second arm 340 to be distant from each other, and next, the second connection portion 221 is brought into close contact with the first connection portion 130. After that, the lever 360 rotates in the counterclockwise direction to allow the first arm 330 and the second arm 340 to be close to each other, and next, the end portion of the first connection portion 130 and the end portion of the second connection portion 221 are inserted into the inner peripheries of the first arm 330 and the second arm 340, so that as shown in FIG. 10, the housing 200a is coupled to the motor housing 110.

As shown in FIG. 10 the first arm 330 and the second arm 340 have the sectional shapes of concaved grooves into which the end portions of the first connection portion 130 and the second connection portion 221 are contactedly inserted thereinto.

FIG. 7 is a bottom perspective view showing the housing of the juice extractor according to the present invention, FIGS. 8 and 9 are perspective views showing the assembling processes of the housing of the juice extractor according to the present invention, and FIG. 10 is an enlarged sectional view showing a portion 'A' of FIG. 2.

A sensor unit 400 is mounted on the driving unit 100 and the juice extracting unit 200, respectively, and as shown in FIGS. 2, 7 and 8, the sensor unit 400 includes a sensor 410 mounted on one side of the first connection portion 130 of the motor housing 110 and a sensor operator 430 mounted on the second connection portion 221 of the housing 200a. The sensor unit 400 is formed of various types of proximity sensors operating when an object comes close to another object, such as a magnetic proximity sensor, an optical proximity sensor, an ultrasonic proximity sensor and so on. If the sensor unit 400 is formed of the magnetic proximity sensor, the sensor 410 is a lead switch operating by means of a magnet, and the sensor operator 430 is a permanent magnet.

If the sensor operator 430 comes close to the sensor 410, the sensor 410 is turned on, and contrarily, if the sensor operator 430 becomes distant from the sensor 410, the sensor 410 is turned off. The sensor 410 is located on the path connecting the motor 150 and power to each other.

As shown in FIGS. 2, 9 and 10, if the juice extracting unit 200 is coupled to the driving unit 100 through the fastening unit 300, the sensor 410 and the sensor operator 430 come close to each other, the sensor 410 is turned on, and if a switch (not shown) is turned on, power is supplied to the motor 150 to drive the motor 150, so that the first crushing roller 251, the second crushing roller 255, the first juice extracting roller 265 and the second juice extracting roller 265 are rotated within the housing 200a through the rotary shaft 170.

According to the present invention, the motor 150 is a reversible motor, and the motor housing 110 has a forward rotation switch (not shown) for forwardly rotating the motor 150, a stop switch (not shown) for stopping the motor 150, and a reverse rotation switch (not shown) for reversely rotating the motor 150. The output of the motor 150 upon forward rotation is lower than that upon reverse rotation. If the forward rotation switch is turned on, a circuit is formed wherein the motor 150 is driven with the lower output than the maximum output thereof, for example, within the range between 75% and 85% of the maximum output thereof, and contrarily, if the reverse rotation switch is turned on, a circuit is formed wherein the motor 150 is driven with the maximum output thereof.

If the forward rotation switch is turned on, the first crushing roller 251 rotates in the counterclockwise direction when viewed in the first direction in FIG. 3, and the second crushing roller 255 engagedly rotating with the first crushing roller 251 rotates in the clockwise direction to allow the juice extraction materials supplied from the hopper 210 to be drawn to the crushing roller portion 250, thus permitting the juice extraction materials to be crushed and transferred forwardly. Contrarily, if the reverse rotation switch is turned on, the first crushing roller 251 rotates in the clockwise direction when viewed in the first direction in FIG. 3, and the second crushing roller 255 rotates in the counterclockwise direction.

FIG. 11 is a perspective view showing an example wherein juice is extracted through the juice extractor according to the present invention, and FIG. 12 is a perspective view showing an example wherein the housing is separated from a driving unit in the juice extractor according to the present invention.

As shown in FIGS. 3, 8, 9 and 11, the housing 130 of the juice extracting unit 200 into which the roller portions are accommodated is coupled to the motor housing 110 of the driving unit 100 by means of the fastening unit 300. The first connection portion 130 of the motor housing 110 is contactedly coupled to the second connection portion 221 of the housing 200a. At this time, the first crushing roller 251 located inside the housing 200a is fitted to the rotary shaft 170, and the second crushing roller 255 is coupled to the fixing shaft 190.

Next, as shown in FIG. 11, the juice extraction materials are introduced into the hopper 210 so as to extract the juice from vegetables or fruits, and the forward rotation switch is turned on to drive the motor 150. While the motor is being forwardly driven, the juice extraction materials may be introduced.

At this time, the driving force of the motor 150 is within the range between 75% and 85% of the maximum driving force thereof.

After that, if the motor 150 is driven, the first crushing roller 251 and the first juice extracting roller 261 are rotated by means of the rotary shaft 170. At this time, since the crushing blades of the first crushing roller 251 are engaged with those of the second crushing roller 255, the second crushing roller 255 and the second juice extracting roller 265 are rotated through the rotation of the first crushing roller 251.

The first crushing roller 251 and the second crushing roller 255 are rotated in the direction facing each other, and the juice extraction materials introduced through the hopper 210 are crushed between the first crushing roller 251 and the second crushing roller 255.

The juice is extracted from the crushed juice extraction materials and discharged through the first juice extracting holes 2201 formed on the crushing housing portion 220, and the discharged juice is dropped and collected to a first container 510 located under the crushing roller portion 250 and the juice extracting roller portion 260.

Next, the juice extraction materials crushed through the first crushing roller 251 and the second crushing roller 255 are transferred from the crushing housing portion 220 to the juice extracting housing portions 230.

The crushed juice extraction materials transferred to the first juice extracting roller 261 and the second juice extracting roller 265 are transferred through the protrusions formed on the first juice extracting roller 261 and the second juice extracting roller 265, while producing the juice therefrom. The juice is dropped and collected through the second juice extracting holes 2301 to the first container 510.

Accordingly, the juice is primarily extracted from the juice extraction materials crushed in the crushing housing portion 220 and discharged through the first juice extracting holes 2201, and next, the juice is secondarily extracted from the juice extraction materials crushed in the juice extracting housing portions 230 and discharged through the second juice extracting holes 2301.

The juice discharged through the first juice extracting holes 2201 and the second juice extracting holes 2301 is moved in the downward direction by means of the cover 270 mounted over the crushing housing portion 220 and the juice extracting housing portions 230. Particularly, the juice discharged through the second juice extracting holes 2301 flows downwardly through the slant surface of the base 231 and gathers into the first container 510.

The remnants of the juice extraction materials from which the juice is extracted through the juice extracting housing portions 230 are moved to the deviation preventing portion 240 and then dropped to a second container 550 located under the deviation preventing portion 240.

While the juice is being extracted from the juice extraction materials, the crushing roller portion 250 and the juice roller portion 260 may be not rotated due to the juice extraction materials caught between the housing 200a and the crushing roller portion 250 and/or the juice extracting roller portion 260, thus stopping the extracting operation.

In the process of the extracting operation, if the rotation of the motor 150 stops due to the juice extraction materials caught between the housing 200a and the crushing roller portion 250 and/or the juice extracting roller portion 260, the reverse rotation switch is turned on. According to the present invention, when the juice extraction materials are crushed and extracted (at the time of the forward rotation), the motor 150 is driven within the range between 75% and 85% of the maximum output thereof, and contrarily, at the time of the reverse rotation, the motor 150 is driven with the output stronger than that at the time of the forward rotation, for example, with the maximum output thereof. Therefore, if the motor 150 stops, the reverse rotation switch is turned on to allow the remnants of the juice extraction materials caught between the housing 200a and the crushing roller portion 250 and/or the juice extracting roller portion 260 to be moved reversely. After that, the forward rotation switch is turned on to drive the motor 150.

In case of the housing 200a is separated from the roller portions so as to wash them after the completion of the extraction, it is not easy to separate the roller portions from the housing 200a due to the remnants of the juice extraction materials caught between the housing 200a and the roller portions.

As shown in FIGS. 6 and 12, the lever 360 of the fastening unit 300 is rotated toward the first arm 330 to allow the first arm 330 and the second arm 340 to be distant from each other, thus releasing the coupled state, and next, if the forward rotation switch is turned on, the roller portions are rotated to push the housing 220a forwardly. As a result, an external force as the reaction force of pushing the housing 220 forwardly is applied to the roller portions from the housing 220a toward the rear side thereof, so that the housing 220a is moved forwardly and separated from the roller portions. As shown in FIG. 12, if the housing 220a is moved forwardly, the sensor operator 430 mounted on the second connection portion 221 of the housing 220a is distant from the sensor 410 mounted on the motor housing 110, thus stopping the operation of the motor 150. In this state, the housing 220a and the roller portions are easily separable from each other, and accordingly, after the operation of the motor 150 stops, the housing 220a is pulled from the front sides of the roller portions and easily separated therefrom.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A juice extractor with an easily assembled and disassembled housing, the juice extractor comprising:
a driving unit having a motor housing having a motor mounted at an inside thereof, a rotary shaft connected to the motor and protruded toward one side of the motor housing, and a fixed shaft disposed adjacent to the rotary shaft on the motor housing;
a juice extracting unit having roller portions operated by the motor provided at the driving unit so as to crush, extract and transfer juice extraction materials and a housing for accommodating the roller portions therein;
a fastening unit for detachably coupling the housing of the juice extracting unit to the motor housing; and
a sensor unit formed of a proximity sensor operating when an object comes close to another object, and having a sensor operator mounted on the housing of the juice extracting unit, and a sensor mounted on the motor housing in such a manner as to be operated by a change in distance with the sensor operator,
wherein the sensor is turned on when the sensor operator comes close to the sensor, and the sensor is turned off when the sensor operator becomes distant from the sensor, and the sensor is located on a path connecting the motor, and power to each other,
wherein the motor is a reversible motor, and upon forward rotation of the motor, the motor is driven with a lower driving force than a driving force upon reverse rotation of the motor,
wherein the juice extraction materials are crushed and transferred forward upon the forward rotation of the motor,
wherein the roller portions comprise: a crushing roller portion for crushing, extracting and transferring the juice extraction materials; and a juice extracting roller portion for transferring, pressurizing and extracting the juice extraction materials transferred from the crushing roller portion,
the crushing roller portion comprising a first crushing roller and a second crushing roller which are coupled correspondingly to the rotary shaft and the fixed shaft and have helical-gear type crushing blades engaged with each other, and
the juice extracting roller portion comprising:
a first juice extracting roller and a second juice extracting roller, which are extended forwardly from the first crushing roller and the second crushing roller, and have outer peripheral surfaces decreased in diameter toward front sides of the juice extracting roller portion,
circular locking protrusions each protruded in a circle on the outer peripheral surfaces of the juice extracting roller portion around a center of the juice extracting roller portion in a lengthwise direction of the juice extracting roller portion,
first protrusion portions each protruded in a spiral along the outer peripheral surfaces behind the circular locking protrusions, and
second protrusion portions each protruded in a spiral along the outer peripheral surfaces in front of the circular locking protrusions, and
wherein the housing comprises a crushing housing portion and juice extracting housing portions branched from the crushing housing portion in such a manner as to be extended forwardly therefrom,
the first crushing roller and the second crushing roller being inserted into the crushing housing portion in such a manner as to allow the crushing blades thereof to be engaged with each other, and
the first juice extracting roller and the second juice extracting roller being inserted into the juice extracting housing portions.

2. The juice extractor according to claim 1, wherein gaps formed between outer diameters of the circular locking protrusions and inner diameters of the juice extracting housing portions are larger than gaps formed between outer diameters of the first protrusion portions and the inner diameters of the juice extracting housing portions.

3. The juice extractor according to claim 1, wherein the gaps formed between the outer diameters of the circular locking protrusions and the inner diameters of the juice extracting housing portions are larger by 1 mm~3 mm than the gaps formed between the outer diameters of the first protrusion portions and the inner diameters of the juice extracting housing portions.

4. The juice extractor according to claim 1,
wherein the fastening unit comprises: an arch-shaped first arm having one end portion hinge-coupled to a front side of the motor housing by means of a first hinge portion; an arch-shaped second arm having one end portion hinge-coupled to the front side of the motor housing by means of a second hinge portion; a lever hinge-coupled to another end portion of the second arm; and a link having one end hinge-coupled to another end portion of the first arm and another end hinge-coupled to an intermediate portion of the lever,
the first arm having a first protrusion portion formed on the hinge-coupled portion to the first hinge portion, and
the second arm having a second protrusion portion formed on the hinge coupled portion to the second hinge portion, the first protrusion portion and the second protrusion portion contactedly intersecting with each other.

5. The juice extractor according to claim 1, wherein the driving force of the motor upon the forward rotation is within a range between 75% and 85% of a maximum driving force thereof.

* * * * *